US008672403B2

(12) United States Patent
Mendis et al.

(10) Patent No.: US 8,672,403 B2
(45) Date of Patent: Mar. 18, 2014

(54) CHILD SEAT

(75) Inventors: Kolita Mendis, Redmond, WA (US);
Björn Wessman, Thousand Oaks, CA (US); Robert Johnston, Vancouver (CA); Andreas Zinn, Newbury Park, CA (US); Larry Abele, Camarillo, CA (US); Maria Hansson, Ventura, CA (US); Lotta Jakobsson, Gräbo (SE); Thomas Broberg, Gräbo (SE); Christian Guse, Torslanda (SE); Stefan Berge, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 8 days.

(21) Appl. No.: 13/494,306

(22) Filed: Jun. 12, 2012

(65) Prior Publication Data

US 2013/0015690 A1    Jan. 17, 2013

(30) Foreign Application Priority Data

Jul. 14, 2011    (EP) .................................... 11173949

(51) Int. Cl.
*B60N 2/26*    (2006.01)
*B60N 2/28*    (2006.01)
*B60N 2/42*    (2006.01)

(52) U.S. Cl.
USPC . 297/216.11; 297/253; 297/254; 297/256.14; 297/256.16

(58) Field of Classification Search
USPC ........... 297/216.11, 253, 254, 256.14, 256.16
See application file for complete search history.

(56) References Cited

U.S. PATENT DOCUMENTS

| 4,113,306 | A | * | 9/1978 | von Wimmersperg | ... 297/216.11 |
| 4,480,870 | A | * | 11/1984 | von Wimmersperg | ... 297/216.11 |
| 4,640,545 | A | * | 2/1987 | von Wimmersperg | ... 297/216.11 |
| 5,332,285 | A | * | 7/1994 | Sinnhuber | ................. 297/254 X |
| 5,487,588 | A | * | 1/1996 | Burleigh et al. | ............... 297/253 |

(Continued)

FOREIGN PATENT DOCUMENTS

| AU | 2010246523 A1 | 6/2011 |
| DE | 19732385 A1 | 1/1999 |

(Continued)

OTHER PUBLICATIONS

The EP Search Report issued in connection with EP Application No. 11173949.6 mailed on Nov. 29, 2011.

*Primary Examiner* — Rodney B White
(74) *Attorney, Agent, or Firm* — Gesmer Updegrove LLP (57) ABSTRACT

The present disclosure relates to a child seat for rearward-facing use in a vehicle. It comprises a back portion and a squab portion. The back portion comprises a force-receiving assembly, located at the shoulder region, which is of a more rigid material than a main portion of the back portion, the main portion being of a light-weight material. The force-receiving assembly comprises a first portion arranged at the first side of the back portion providing an anchor point for a shoulder portion of a child safety belt arrangement. The force-receiving assembly further comprises a second portion arranged at the second side of the back portion providing an anchor point for a child seat fixation means. The disclosure further relates to a child seat arrangement, a kit of parts and a vehicle comprising the child seat.

15 Claims, 8 Drawing Sheets

(56) References Cited

U.S. PATENT DOCUMENTS

| | | | |
|---|---|---|---|
| 5,630,645 A * | 5/1997 | Lumley et al. | 297/216.11 X |
| 5,685,603 A * | 11/1997 | Lane, Jr. | 297/216.11 |
| 5,810,435 A * | 9/1998 | Surot | 297/216.11 X |
| 5,820,215 A * | 10/1998 | Dreisbach | 297/256.16 |
| 5,941,600 A * | 8/1999 | Mar et al. | 297/254 X |
| 6,237,999 B1 * | 5/2001 | Hobson | 297/256.16 X |
| 6,592,183 B2 * | 7/2003 | Kain | 297/253 |
| 6,817,665 B2 * | 11/2004 | Pacella et al. | 297/216.11 X |
| 6,869,141 B2 * | 3/2005 | Yamaoka et al. | 297/253 |
| 7,083,237 B2 * | 8/2006 | Horton et al. | 297/216.11 X |
| 7,097,245 B2 * | 8/2006 | Barker | 297/256.14 |
| 7,328,946 B2 * | 2/2008 | Hendrikus Van Montfort et al. | 297/253 |
| 7,390,064 B2 * | 6/2008 | Horton et al. | 297/216.11 X |
| 7,441,733 B2 * | 10/2008 | Chen et al. | 297/256.16 X |
| 7,467,824 B2 * | 12/2008 | Nakhla et al. | 297/216.11 |
| 7,467,825 B2 * | 12/2008 | Jane Santamaria | 297/253 |
| 7,472,952 B2 * | 1/2009 | Nakhla et al. | 297/216.11 |
| 7,984,947 B2 * | 7/2011 | Pos | 297/256.14 X |
| 8,366,192 B2 * | 2/2013 | Clement et al. | 297/253 |
| 8,496,293 B2 * | 7/2013 | Gaudreau, Jr. | 297/216.11 |
| 2002/0000743 A1 * | 1/2002 | Mori et al. | 297/216.11 |
| 2002/0000744 A1 * | 1/2002 | Maciejczyk | 297/254 |
| 2003/0047972 A1 * | 3/2003 | Burleigh et al. | 297/216.11 |
| 2004/0095004 A1 * | 5/2004 | Horton et al. | 297/216.11 X |
| 2005/0092539 A1 * | 5/2005 | Chitalia et al. | 297/216.11 X |
| 2006/0006714 A1 * | 1/2006 | Van Geer et al. | 297/256.16 |
| 2008/0012401 A1 * | 1/2008 | Amesar et al. | 297/216.11 |
| 2008/0224516 A1 * | 9/2008 | Vegt | 297/256.16 |
| 2008/0303321 A1 * | 12/2008 | Powell | 297/216.11 |
| 2010/0060046 A1 * | 3/2010 | Vertegaal | 297/216.11 |
| 2011/0089732 A1 * | 4/2011 | Yang | 297/256.16 |
| 2012/0098304 A1 * | 4/2012 | Gaudreau, Jr. | 297/216.11 |
| 2012/0319442 A1 * | 12/2012 | Clement | 297/216.11 |

FOREIGN PATENT DOCUMENTS

| | | |
|---|---|---|
| DE | 102006033849 A1 | 5/2007 |
| WO | 2004091964 A1 | 10/2004 |
| WO | 2006030048 A1 | 3/2006 |

* cited by examiner

CHILD SEAT

PRIORITY INFORMATION

This application is claims priority to EP Application No. 11173949.6, filed on Jul. 14, 2011, which is incorporated herein by reference in its entirety.

TECHNICAL FIELD

The present disclosure relates to a child seat for rearward-facing use in a vehicle according to the preamble of claim 1. The disclosure further relates to a child seat arrangement, a kit of parts and a vehicle comprising the child seat.

BACKGROUND

Child seats for use in a vehicle as such are known.

It is further known that in many situations a child, especially a small child, travels more safely in a child seat facing rearwards than forwards, since a rearward-facing child seat provides more support for the child's head in the event of a sudden deceleration. Such rearward-facing child seats may be placed on the front passenger seat and/or the rear seat.

A child seat may comprise a shell of a rigid material such as plastic, which shell is intended to protect the child in case of a collision. The shell is commonly at least partly covered by a cover of a softer material to provide comfort for the child. However, due to the weight of the shell, such a child seat has a considerable weight and may therefore be difficult to handle, especially when installing the child seat in a vehicle or removing it from the vehicle. Further, when not in use, it may be desirable to store the child seat somewhere else in the vehicle and it will then, due to its construction, occupy a rather large space for example in the luggage boot.

WO2006/030048 A1 relates to an inflatable child seat which can be fitted to the rear part of front passenger seat of a motor vehicle. A support is mounted to the back rest of the front passenger seat using fixing means comprising clamps that are positioned on the back rest. In addition, a structure of a box is removably mounted to the support with a fixing anchor. The box comprises a part which can rotate by means of hinges and a cover that rests on an area of the rear seat of the vehicle. In this way, when the child seat is closed, the visible face thereof is aligned with the rear surface of the back rest. Moreover, the box contains a canvas surface which is built into the inner periphery of the box and the cover. The canvas surface is equipped with a safety belt for the baby, such as to define a housing which communicates with an air inlet for inflating the seat-forming canvas using air from an actuated compressor that is connected to the electric system of the vehicle.

Since, according to WO2006/030048 A1, the child seat is attached to the front seat, its safety in case of an accident is dependent on the properties of the front seat. Thus, if the back rest of the front seat were to collapse in a collision, so too will the child seat.

Moreover, the suspension of the child seat of WO2006/030048 A1 is further influenced by the angle of the backrest. If the back rest is reclined backwards, the child seat will be sloped in such a way that the child may slide along the seat cushion. It may therefore be difficult to obtain a comfortable position of the back rest for a passenger at the same time that a child is able to sit securely in the child seat.

SUMMARY

The object of the present disclosure is to overcome or ameliorate at least one of the disadvantages of the prior art, or to provide a useful alternative.

It is desirable to provide a rearward-facing child seat, which is easy to handle, especially when installing it in a vehicle or removing it from the vehicle.

It is further desirable that the rearward-facing child seat has a low weight, facilitating the easy handling, since the adjustment and movement of heavy objects in general in a passenger car is extremely awkward. Yet, at the same time it is desirable that the rearward-facing child seat provides adequate safety for a child being seated in the child seat.

It is also desirable to provide a rearward-facing child seat, which may be mounted in a vehicle directly to the vehicle body or interior, e.g. by an ISO fix point, in order to be independent of the back rest of the front seat.

One or more of the objects above may be achieved by the subject-matter of claim 1.

Thus, in a first aspect of the present invention there is provided a child seat for rearward-facing use in a vehicle. The child seat comprises a back portion and a squab portion. The back portion comprises a first side being adapted to support the back of a child, when the child sits in the child seat, and a second side, opposite of the first side. The back portion further comprises a lower back region, a shoulder region, and a head region. The squab portion is adapted to support the bottom of the child, when the child sits in the child seat. The child seat further comprises a child safety best arrangement for securing the child to be seated in the child seat. The back portion comprises a force-receiving assembly located at the shoulder region, the force-receiving assembly being of a more rigid material than a main portion of the back portion, the main portion being of a light-weight material. The force-receiving assembly comprises a first portion arranged at the first side of the back portion providing an anchor point for a shoulder portion of the child safety belt arrangement. The force-receiving assembly further comprises a second portion arranged at the second side of the back portion providing an anchor point for a child seat fixation means.

At least the main portion of the back portion is essentially made of a light-weight material. Besides the main portion, there may also be details made of other materials such as the connection members described below. Examples of suitable light-weight materials are extruded foam, such as polystyrene, and inflatable air chambers. It would also be possible to fill the chambers with another gas, but air is practical since it is readily available.

The force-receiving assembly is arranged to take up and transfer forces. It provides strength and durability for anchoring of the child seat fixation means and the shoulder portions of the child safety belt arrangement. The first and second portions of the force-receiving assembly are therefore made of a more rigid material than the main portion of the back portion. They may suitably be made of metal or a strong plastic. The combination of a light-weight material for the main portion of the back portion with the more rigid force-receiving assembly results in a low-weight child seat providing adequate safety for a child seated in it in case of a collision. Such a child seat is possible to mount in a vehicle independently of the front seat.

Preferably, the main portion of the squab portion is also made of a light-weight material, most preferably of the same or a similar material as the back portion. The child seat may further comprise side portions located at the lateral skies of the back portion and the squab portion, which in that case preferably also are made of the light-weight material. Essentially the whole child seat, except for the force-receiving assembly, may thus be made of the light-weight material.

The purpose of the light-weight material is to provide a child seat, which weighs less than a conventional child seat comprising a plastic shell. The child seat according to the invention may thus weigh 10% less, preferably 20% and most preferably 30%, and in some cases up to 50%, less than a conventional child seat of equal size.

The child seat fixation means is used to secure the child seat to the vehicle. The child seat fixation means may be a belt or a strap. In addition to being anchored to the second portion of the force-receiving assembly, it may be sewn, stitched, bonded or glued to the child seat in at least at one location, at the end or somewhere mid-span. It would also be possible to use a safety belt of the back seat as a child seat fixation means. Further alternative child seat fixation means in the form of a rigid subframe are described below.

In an embodiment, an end of the shoulder portion of the child safety belt arrangement is attached to the first portion of the force-receiving assembly. Thereby, a force may be transferred from the shoulder portion to the first portion. By attaching the end to the first portion, there will be no safety belt passing through the back portion, as is common for conventional child seats comprising a shell of a rigid material. Thereby, there is no need to have an opening for the safety belt through the back portion. This embodiment is especially advantageous if using a child seat comprising an inflatable air chamber as described below.

The force-receiving assembly may comprise means for anchoring the shoulder portion at a selectable distance from the squab portion. Thereby the child seat may be adapted to children of varying size. One way is to provide the first and/or second portion of the force-receiving assembly with slots at various heights. Alternatively, the force-receiving assembly may provide vertical adjustability by being slidable or by providing a plurality of connection points. A child seat according to the invention may be suitable for children up to 4 years of age.

The first and the second portion of the force-receiving assembly may be connected to each other by a connection belt or strap. The connection belt or strap holds the first and second portion together. Further, the connection belt or strap helps to transfer forces of the shoulder portions of the child safety belt arrangement via the first portion to the second portion of the force-receiving assembly.

In an embodiment, the child seat fixation means comprises a belt or strap passing through the first and the second portion of the force-receiving assembly. With this arrangement, the child seat fixation means will contribute to holding the first and second portion of the force-receiving assembly together.

The child seat fixation means may be provided with a loop, a hook and/or a latch for attachment to a vehicle seat, floor or interior. This facilitates quick and easy attachment, as well as quick and easy release.

In an embodiment, the child seat comprises at least one, at least partly inflatable, air chamber. The child seat may be assembled from multiple inflatable air chambers. The child seat may further comprise side portions adapted to be located at the respective lateral side of the back portion and the squab portion, when the child seat is inflated, the side portions also forming at least partly inflatable air chambers. The back, squab and side portions may be formed as separate air chambers. As an alternative, two or more of the back, squab and side portions may form a common air chamber. In particular the back portion and squab portion may be formed as an integral unit.

The whole child seat may be formed from one single air chamber. Alternatively, the air chambers of the back portion, squab portion and side portions may be interconnectable, such that they form a continuous inflatable volume, for example by the use of grommets, which are paired to provide an unobstructed airtight passage between the air chambers. Advantageously, it is possible to inflate the whole child seat through one single port.

If inflatable, the air chamber may be made of a gas impermeable fabric and may comprise limiting means for limiting a maximal separation between at least two gas impermeable fabric surfaces, the limiting means for example being provided by a drop-stitch fabric. The limiting means helps to maintain a constant separation between the surfaces of the fabric when inflated, resulting in an air chamber that has essentially flat surfaces that do not curve outwards. This is advantageous when forming a child seat, since it is desirable that each of the back portion, squab portion, and side portions forms a relatively flat surface.

In order to connect a belt or strap to the child seat, connection members may be used, e.g. a loop, a D-ring or a double D-ring. The connection members may be sewn, stitched, bonded and/or glued to the child seat, for example to the impermeable fabric of an inflatable air chamber.

In order to further reinforce the child seat, it may be provided with at least one reinforcement belt/strap, the reinforcement belt/strap extending along a surface of the child seat, on the inside and/or the outside of the child seat. The reinforcement belt/strap may envelop the child seat. The reinforcement belt/strap may further be connected to the child seat fixation means.

In an embodiment the child seat comprises a flexible panel adapted to be extending from the child seat, along a lateral side of the child seat when mounted, to a connection point in the vehicle floor or interior. The flexible panel may be made in one piece, which envelops the back of the child seat, or as two separate side pieces.

The child seat may comprise an interchangeable cover, which at least partly encloses the child seat. The cover may provide a comfortable surface for the child sitting in the child seat. The cover may be removed to be washed or exchanged. Further, it is easy to make a cover which matches the interior fittings of the vehicle, e.g. by using the same kind of fabric as for the vehicle seats. When using a cover, a child seat fixation means in the form of belts, or an optional reinforcement belt/strap, may extend along a surface of the child seat beneath the cover, such that the belt/strap is invisible externally.

In a second aspect of the present invention, there is provided a child seat arrangement comprising a child seat as described above and at least one rigid subframe, wherein the child seat is adapted for attachment to the at least one rigid subframe, and the rigid subframe is adapted for attachment to a vehicle floor or interior, such that forces may be transferred to and from the child seat to the vehicle floor or interior. The subframe may be in the form of a leg connecting the child seat to a rail or any other suitable fix point on the vehicle floor. The subframe may also comprise a docking unit located on the back seat.

In a third aspect of the present invention, there is provided a kit of parts comprising a child seat according to above and an inflator for inflating the child seat, the inflator being integrated into the child seat. Advantageously, the child seat is in that case inflatable through a single port.

In a fourth aspect of the present invention, there is provided a vehicle comprising a child seat according to the first aspect above, a child seat arrangement according to the second aspect above or a kit of parts according to the third aspect above, wherein the child seat is mountable in a rearward-facing position in a back seat of the vehicle, such that the fastening of the child seat is made by the child seat fixation means being connected directly to the vehicle body or interior, e.g. by an ISO fix point. Thereby, the fastening of the child seat is independent of the front seat. Further, since the child seat is provided with child seat fixation means, it may be mounted in the vehicle independently of the safety belts of the vehicle.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
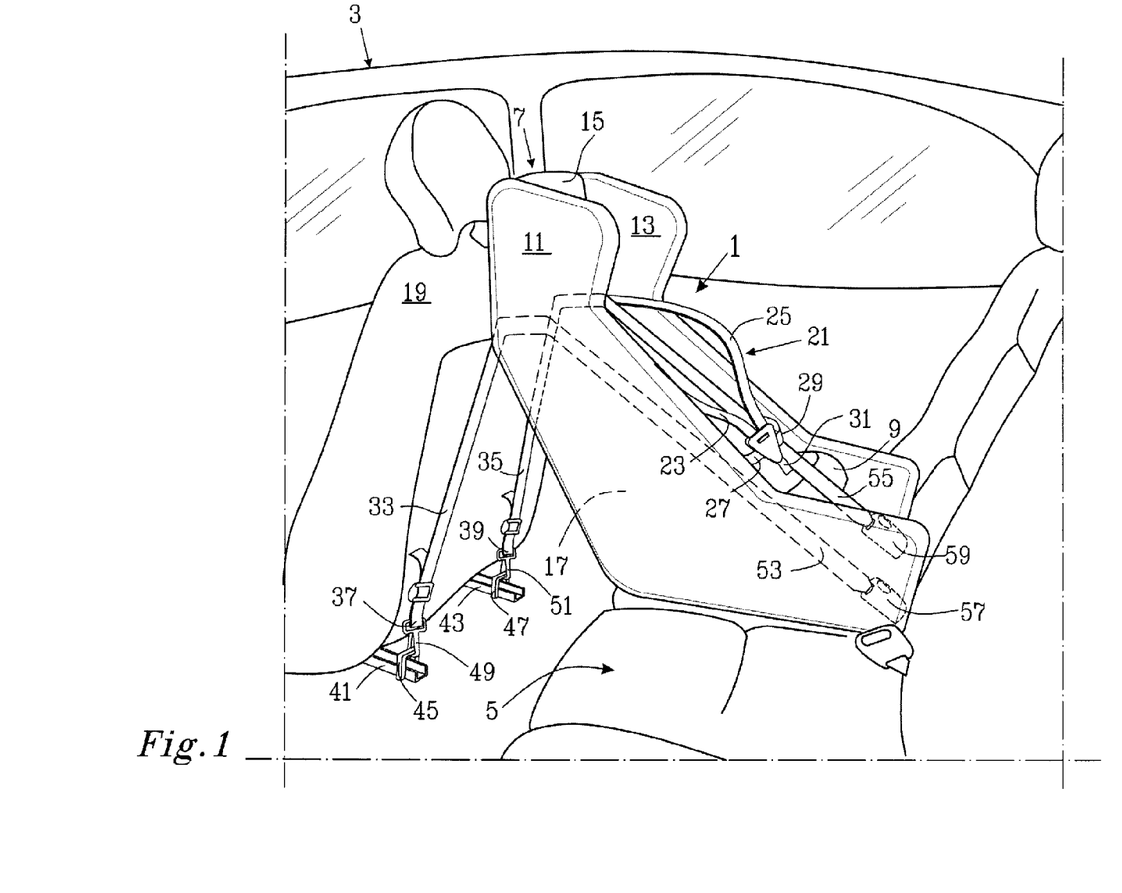
FIG. 1 illustrates a child seat according to a first embodiment of the invention when mounted in a vehicle.

FIG. 1 schematically illustrates a child seat 1 when mounted in a vehicle 3. The child seat 1 rests on the back seat 5 of the vehicle 1 in a rearward-facing position. The child seat 1 comprises a back portion 7, a squab portion 9, and a first 11 and a second side portion 13, located at the lateral sides of the back portion 7 and the squab portion 9. The back portion 7 has a first side 15 adapted to support the back of a child and a second side 17 being opposite of the first side 15 and facing the back rest of the front seat 19. The child seat 1 further comprises a child safety belt arrangement 21 for securing a child to the seat, here illustrated by a 5-point safety belt comprising a first 23 and a second 25 shoulder portion, a first 27 and a second 29 waist portion and a seat buckle portion 31. The child seat may also comprise further portions, such as a separate head rest portion.

The child seat 1 is attached to the vehicle 3 by means of child seat fixation means, here illustrated by a first 33 and a second 35 belt. Each belt 33, 35 is at a first end 37, 39 attached to rails 41, 43 on the vehicle floor by means of loops 45, 47 and hooks 49, 51. Alternatively, the child seat fixation means may be connected to any other structure of the vehicle floor or interior, such as attachments especially provided to secure the child seat. However, it is desired that the child seat fixation means is connected to the vehicle interior or floor, and not to the front seat 19. Thereby the attachment is independent of the front seat 19. Further, since the child seat 1 is provided with child seat fixation means, it may be mounted in the vehicle 3 independently of the safety belts of the vehicle 3.

A second end 53, 55 of each belt 33, 35 is attached to ISO fix attachments 57, 59 located in the back seat 5. It is therefore suitable if the distance between the side portions 11, 13 matches the distance between the ISO fix attachments 57, 59. As an alternative (not illustrated) the second end 53, 55 of the belt 33, 35 may be attached to a seat buckle located in the back seat 19.

Even if the child seat fixation means in FIG. 1 is illustrated as one belt passing through the child seat 1 and extending from the lower attachment point at the rail 41, 43 to the ISO fix attachment 57, 59, the child seat fixation means may instead (not illustrated) comprise two or more separate belts, for example a front belt extending from the child seat 1 to the rail 41, 43 and an rear belt extending from the child seat to the ISO fix attachment 57, 59. The child seat fixation means may be arranged pair-wise, one at each side of the child seat 1.

Moreover, the safety belt of the back seat 5 may also be used for attachment of the child seat 1 to the vehicle 3. This may be used as an alternative to attachment to the ISO fix attachments 57, 59 or as a complement.

The child seat 1 may further comprise an interchangeable cover, not illustrated, which at least partly encompasses the child seat 1. The cover may provide a comfortable surface for the child sitting in the child seat. The cover may be removed to be washed or exchanged. Further, it is easy to make a cover which matches the interior fittings of the vehicle, e.g. by using the same kind of fabric as for the vehicle seats. When using a cover, the belts 33, 35 may extend along a surface of the child seat 1 beneath the cover, such that the belts 33, 35 are invisible externally.

The child seat may also comprise cushions of e.g. lightweight foam which may be attached to the child seat in order to change the surface contour. Such cushions may for example be used to provide a comfortable head rest for the child. These cushions may be attached as separate units or be integrated into the cover.

Figure 2A:
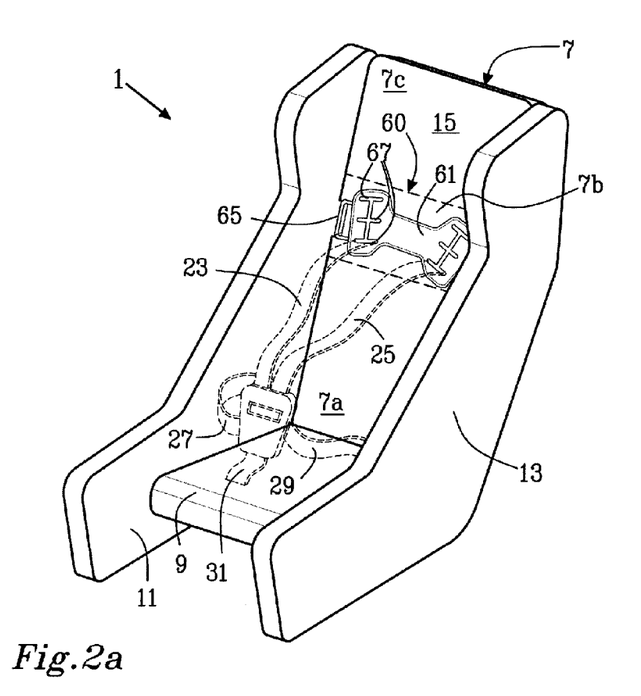
FIG. 2a is a perspective front view of the child seat of FIG. 1.
Figure 2B:
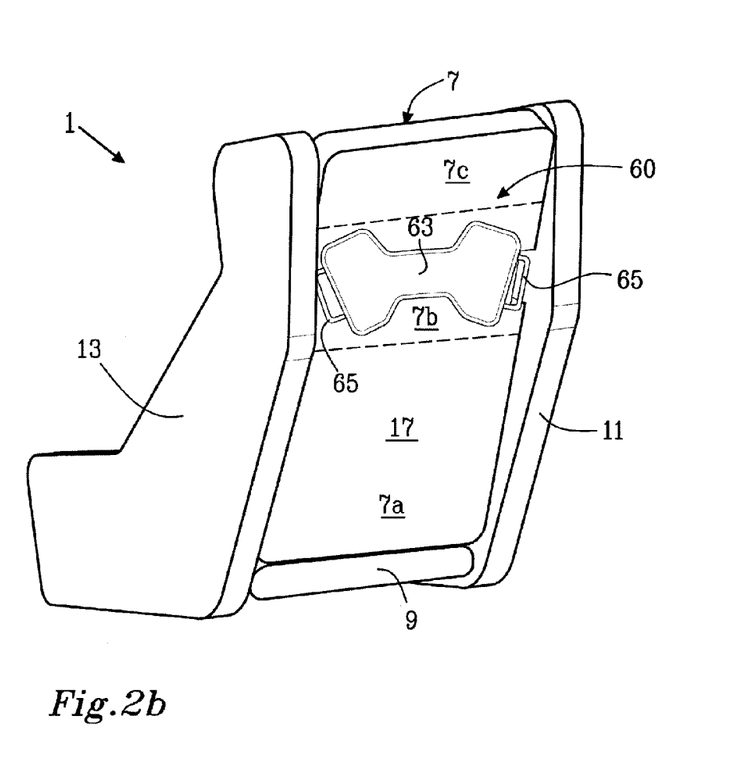
FIG. 2b is a perspective rear view of the child seat of FIG. 1.

FIGS. 2a and 2b are perspective views of the child seat 1 seen from the front and from behind. The back portion comprises a lower back region 7a, a shoulder region 7b and a head region 7c. The shoulder region 7b is located at a height corresponding essentially to the shoulders of a child when seated in the child seat 1. In the same way, the head region 7c corresponds to the head of a child when seated in the child seat 1. Since the child seat may be used by children of varying size, the shoulder region 7b extends in the height direction from an infant size to a height corresponding to the largest child, for which the child seat is intended, e.g. 4 years. If the child seat is used by a small child, not only its shoulders, but also its head may be located at least partly at the shoulder region.

A force-receiving assembly 60 is located at the shoulder region 7b and comprises a first portion 61 at the first side 15 of the back portion 7, and a second portion 63 at the second side 17 of the back portion 7. The first portion 61 provides an anchor point for the shoulder portion 23, 25 of the safety belt. The force-receiving assembly 60 is further adapted also to receive the child seat fixation means. In the illustrated child seat 1, loops 65 are provided in the first 61 and second portion 63, through which the belts 33, 35, illustrated in FIG. 1, may pass.

Figure 2C:
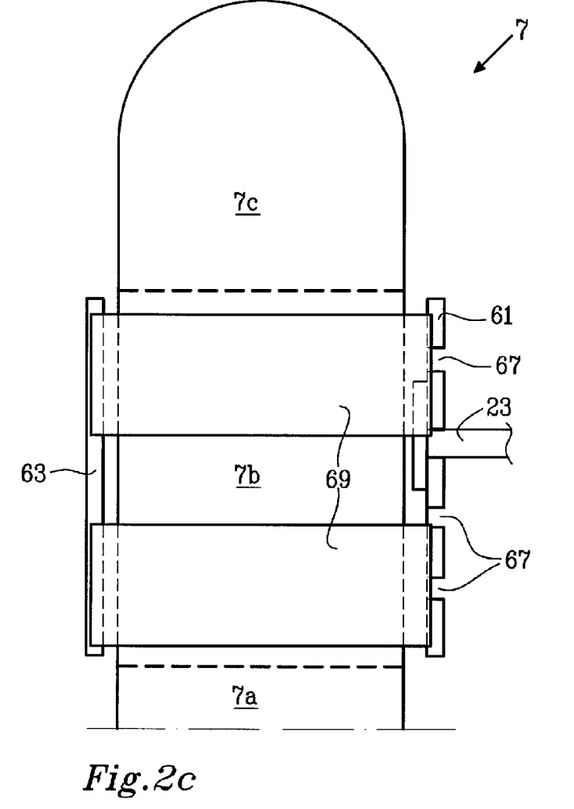
FIG. 2c is a cross-sectional view of the child seat of FIG. 1.

The force-receiving assembly 60, here the first portion 61 and the second portion 63, is made of a more rigid material than a main portion of the back portion 7. The main portion of the back portion 7 may for example be made of fabric or plastic, which will be described in more detail below in conjunction with FIG. 3. The first 61 and second 63 portion may be made of a rigid plastic or metal. The first 61 and second portion 63 may be directly connected to each other through the back portion 7, or as in the illustrated embodiment, be connected to each other by means of at least one connection belt 69 as seen in FIG. 2c. The connection bell 69 helps to transfer forces of the shoulder portions 23, 25 via the first portion 61 to the second portion 63 of the force-receiving assembly 60. The connection belt 69 may extend around the circumference of the back portion 7. As an alternative, separate connection belts 69 may be used at each lateral side of back portion 7. Further, in principle, the first portion 61 and second portion 63 may be one and the same unit, which in that case preferably is located such that it is available both from the first 15 and second side 17 of the back portion 7 in order to be able to anchor both the child seat fixation means, e.g. belts 33, 35, and the shoulder portions 23, 25 of the safety belt.

In order for the child seat 1 to be able to function for children of different sizes, the shoulder portions 23, 25 of the safety belt may be attached at a selectable height, here achieved by providing a plurality of slots 67 at various heights in the first portion 61. Alternatively, the force-receiving assembly may provide vertical adjustability by being slidable or by providing a plurality of connection points. A child seat according to the invention may be suitable for children up to 4 years.

In an alternative embodiment, not illustrated, the part of the safety belt 21 forming the shoulder portion 23, 25 may pass through one of the slots 67, through an opening in the back portion 7 to the second portion 63 of the force-receiving assembly 60, continue at the second side 17 of the back portion 7, return through another opening in the back portion 7 and form one of the waist portions 27, 29 of the safety bell 21.

Another alternative (not illustrated) would be to let one belt form both shoulder portions. A portion of that belt may in that case extend along the first portion 61 of the force-receiving assembly 60, from a position corresponding to the left shoulder of the child to a position corresponding to the right shoulder of the child.

The child seat fixation means may form a part of the child seat 1, for example by being sewn, stitched, bonded or glued to the child seat 1 at least at one location, at the end or somewhere mid-span, such that the child seat fixation means and the child seat 1 form one unit. The child seat fixation means may also be connected to the child seat by passing through loops 65, as in FIGS. 2a and b, or by a hook or a latch. Preferably, the child seat fixation means is attached to the second portion 63 of the force-receiving assembly. The child seat fixation means is detachably attachable to the vehicle interior.

As an alternative the child seat fixation means may instead form separate units, such as loose belts or straps, which may be attached to the vehicle interior and to the child seat 1, respectively.

Figure 3:
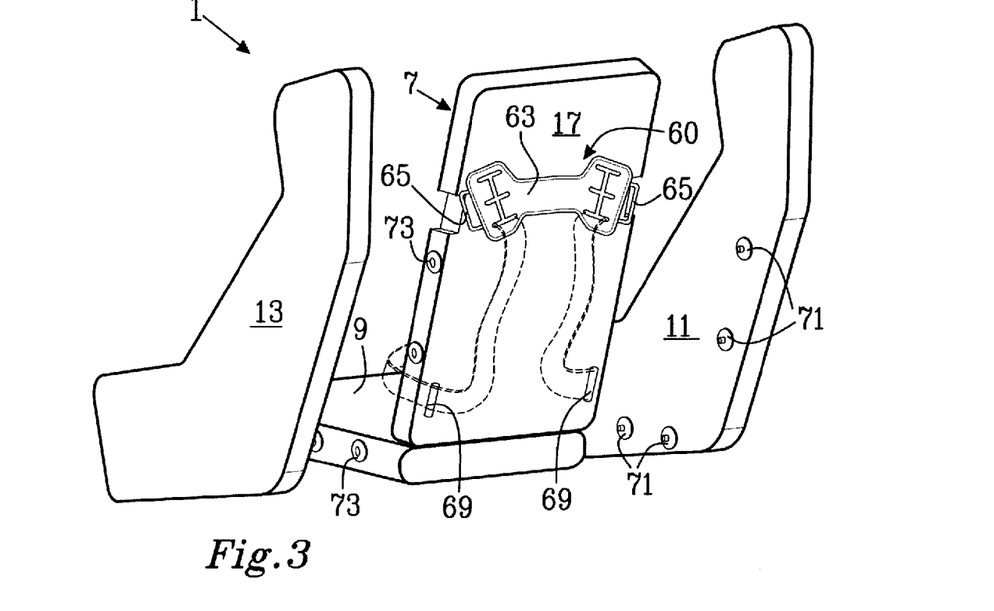
FIG. 3 illustrates the inflatable air chambers of the child seat of FIG. 1.

As illustrated in FIG. 3, the child seat 1 may be assembled from multiple inflatable air chambers. FIG. 3 illustrates the back portion 7, the squab portion 9 and the side portions 11, 13 as separate air chambers. As an alternative, two or more of the portions 7, 9, 11, 13 may form a common air chamber. In particular the back portion 7 and squab portion 9 may be formed as an integral unit.

Preferably, the air chambers are interconnectable such that they form a continuous inflatable volume requiring only a single port for inflation and deflation.

Interconnection between the one or more inflatable air chambers forming the portions 7, 9, 11, 13 may for example be achieved by using hollow plastic grommets 71, 73 as illustrated in FIG. 3. These grommets 71, 73 are attached to each air chamber in a manner that allows the grommets 71, 73 located opposite each other to snap fit and/or glue together to provide a continuous inflatable volume between the air chambers. The grommets 71, 73 should preferably be thin walled, such that they are flexible with the fabric of the air chambers. Attachment surfaces for bonding to the fabric should preferably be provided with ridges or similar structural elements in order to facilitate bonding between the grommets 71, 73 and the fabric. The grommets 71, 73 are intended to be paired to fit together to provide an unobstructed air-tight passage between the air chambers. Once the child seat 1 has been assembled, the grommets 71, 73 are essentially invisible to an external viewer. A series of air chambers thus connected require only a single port for inflation and deflation.

Alternatively, the portions 7, 9, 11, 13 of the child seat 1 may be configured as one common air chamber, thereby being possible to inflate through one single port. Yet another alternative would be to use separate ports for the different portions 7, 9, 11, 13 of the child seat 1.

With the above described design the entire inflatable child seat 1 can be inflated and deflated through a single port or air valve. Thus, when inflated, the pressure through the inflatable child seat 1 places the structure in an operating mode where it becomes a substantially rigid structure due to the air pressure. Then, when it is deflated, the child seat can be folded into a rather compact package for easy stowage in the vehicle.

In order to achieve air chambers having essentially flat sides where required, the chambers may be constructed out of a non-permeable fabric that comprises means for limiting a maximal separation between at least two non-permeable fabric surfaces when inflated. It is appropriate to use what is commonly called a "drop-stitch fabric" or "drop-stitch structure" as the moans for limiting a maximal separation in order to provide the basic structure of the inflatable child seat 1.

Figure 4:
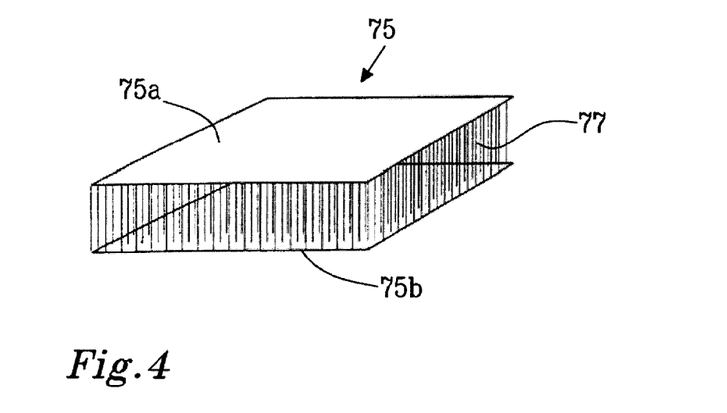
FIG. 4 is a schematic view of a drop-stitch fabric.

As shown in FIG. 4, the "drop-stitch fabric" 75 comprises upper and lower non-permeable fabric layers 75a and 75b, with a core section positioned between, and connected to, the upper and lower non-permeable fabric layers 75a and 75b. This core section comprises a plurality of individual stitches, e.g. threads or cords 77, which have upper and lower end portions which connect to, respectively, the upper and lower non-permeable fabric layers 75a and 75b. The stitching 77 thus limits a maximal separation between the non-permeable surfaces 75a and 75b of the inflatable drop-stitch fabric 76 when inflated. According to the embodiment of FIGS. 3 and 4, the air chamber is constructed out of drop-stitch fabric 75 which comprises two flexible non-permeable surfaces 75a and 75b that are spanned by a plurality of stitches 77 of fixed lengths. The stitching 77 thus, as stated above, maintains a constant separation between the non-permeable surfaces 75a and 75b when inflated, resulting in an air chamber that has essentially flat surfaces that do not curve outwards.

The main portion of the child seat is made of a light-weight material. Besides the main portion, there may also be details made of other materials such as the connection members described below in conjunction with FIGS. 8a and b. Examples of suitable light-weight materials are extruded foam, such as polystyrene, and the above-mentioned air chambers. It would also be possible to fill the chambers with another gas, but air is practical since it is readily available. The child seat may also be partly inflatable, for example by having inflatable side portions and non-inflatable back portion and squab portion made of another light-weight material.

The purpose of the light-weight material is to provide a child seat, which weighs less than the conventional child seats comprising a plastic shell. The child seat according to the invention may thus weigh 10% less, preferably 20% and most preferably 30%, and in some cases up to 50%, less than a conventional child seat of equal size.

Since the main portion of the back portion 7 is constituted by a light-weight material, it is the force-receiving assembly 60 that provides strength and durability needed for anchoring of the child seat fixation means 33, 35 and the shoulder portions 23, 25 of the safety belt. The first 61 and second 63 portions of the force-receiving assembly are therefore made of a more rigid material than the main portion of the back portion 7. They may suitably be made of metal or a strong plastic. The force-receiving assembly is thus made of a more rigid material than the main portion of the back portion.

Figure 5:
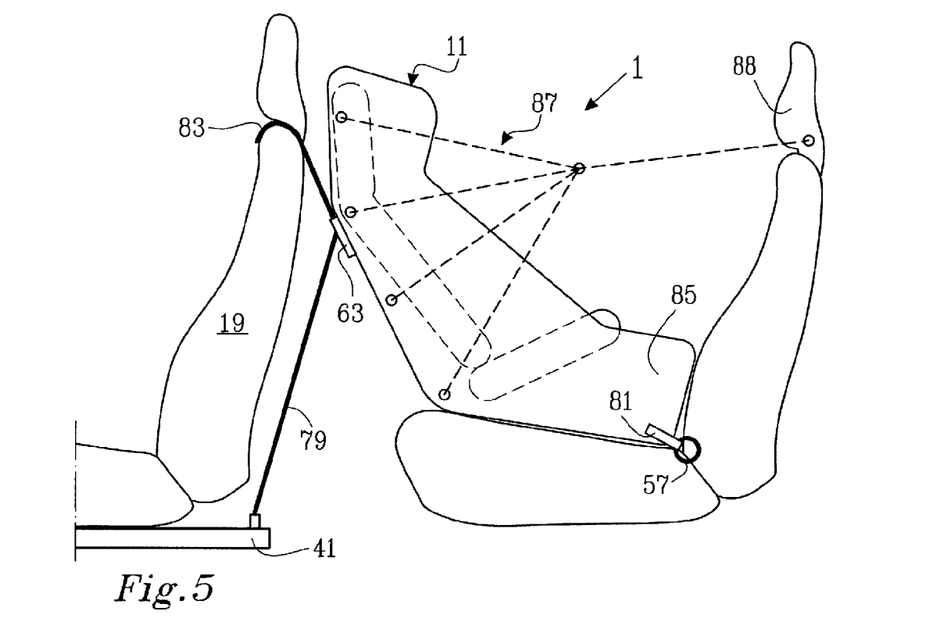
FIG. 5 illustrates alternative child seat fixation means in the form of belts.
Figure 9:
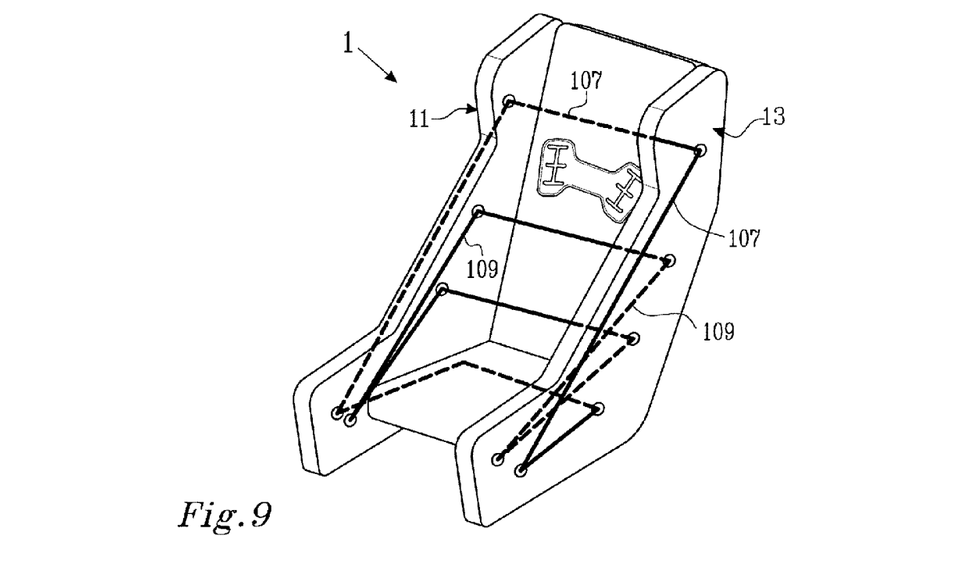
FIG. 9 illustrates a child seat comprising reinforcement belt/straps.

FIG. 5 illustrates a number of alternative child seat fixation means. One or more of them may be used at the same time, also together with the child seat fixation means in the form of the belts 33, 35 described in conjunction with FIG. 1. A front belt 79 extends from the second portion 63 of the force-receiving assembly to the rail 41 or any other suitable fix point on the vehicle floor. Suitably, a second front belt (not illustrated) is used, connecting to the rail 43. A headrest strap 83 passes around the back rest or a head rest of the front seat 19. An ISO-fix strap 81 connects the child seat 1 to the ISO fix attachment 57. The other end of the ISO-fix strap 81 may be attached to a rear end 85 of the child seat or to a reinforcement strap/belt as described below in conjunction with FIG. 9. Suitably, a second ISO-fix strap is used, connecting to the other ISO fix attachment 59. One or more rear straps 87 may connect the back portion 7 or side portions 11, 13 to the back seat. They may for example pass around a head rest 88.

Figure 6:
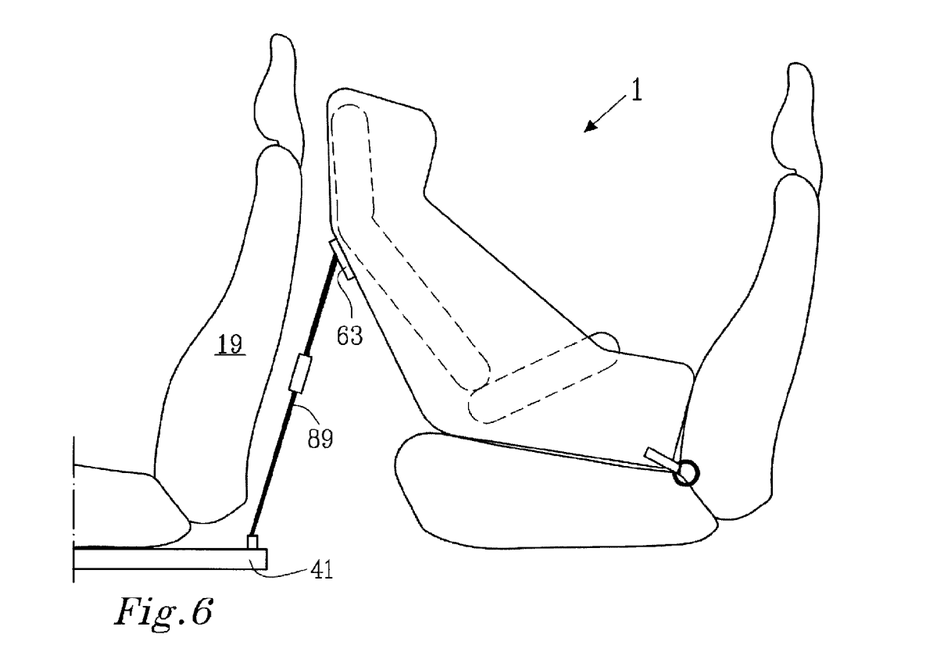
FIG. 6 illustrates alternative child seat fixation means in the form of a rigid subframe.
Figure 7:
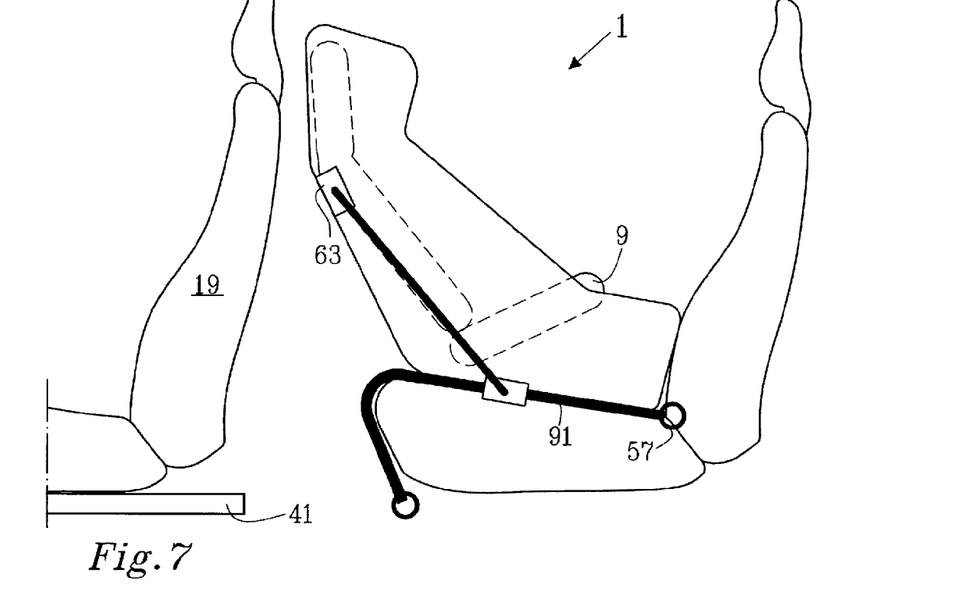
FIG. 7 illustrates alternative child seat fixation means in the form of a docking unit.

Instead of, or complementary to, using belts 31, 35, at least one rigid subframe may be used as illustrated in FIGS. 6 and 7. In FIG. 6 the rigid subframe extends between the second portion 63 of the force-receiving assembly and one or both of the rails 41, 43 or any other suitable fix point on the vehicle floor in the form of a leg 89. The subframe 89 may have a telescoping function in order to adapt the length of it to the vehicle, in which the child seat 1 is to be mounted. The leg 89 may be attached to the child seat 1 via a pivotable joint, which may be located at a supplementary bracket, which is mounted at the second portion 63. In FIG. 7 the rigid subframe comprises a docking unit 91 located on the back seat 5 and preferably attached to the ISO fix attachments 57, 59 and to the vehicle floor. The clocking unit 91 is connected to the child seat 1 via the second portion 63 of the force-receiving assembly, e.g. via a pivotable joint. Since the subframe, e.g. the leg 89 or the docking unit 91, is rigid, it may transfer forces to and from the child seat.

Figure 8A:
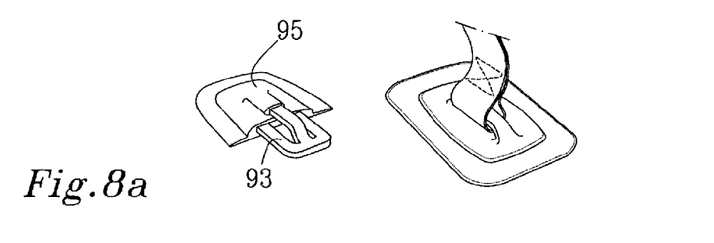
FIG. 8a illustrates an attachment for a belt/strap.
Figure 8B:
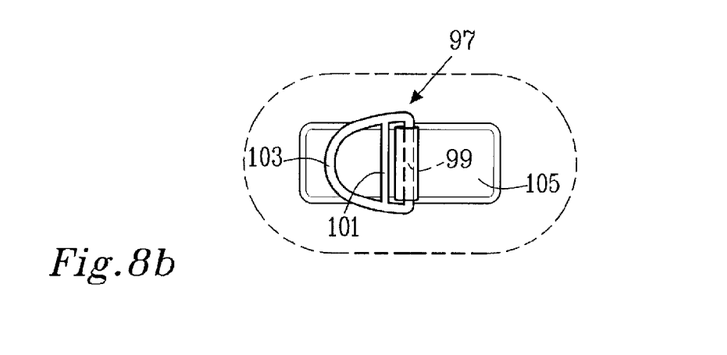
FIG. 8b illustrates an alternative attachment for a belt/strap.

FIGS. 8a and 8b show in detail how belts and straps, such as the ones used as child seat fixation means and safety belts, may be attached to the child seat by means of connection members 93, 97. Such attachments are for example suitable when using a child seat comprising inflatable air chambers as illustrated above in FIGS. 3 and 4. FIG. 8a shows a metal loop 93 moulded as reinforcement into a plastic attachment 95. This is suitable for the attachment of a belt, as shown to the right in the figure. FIG. 8b illustrates a double D-ring 97, which may be used to transfer forces from one belt/strap to another without passing through the inflatable air chamber. The double D-ring comprises a first part 99, which is attached to the surface of the child seat, a second part 101, whereto one belt strap may be attached, and a third part 103 whereto another belt strap may be attached. Thereby a force may be transferred from one belt/strap to another without the belts passing through the inflatable air chamber. The double D-ring may be attached to the child seat by a patch 105, which may be sewn, stitched, bonded or glued to the child seat. It is also possible to use a normal, i.e. single, D-ring for connecting one belt to the surface of the child seat.

Reinforcement belt/straps may be used to reinforce the child seat 1. One or more reinforcement belt/strap may be used, as exemplified by two belts in FIG. 9. The reinforcement belt/straps may run along the inside and/or the outside of the child seat. If a cover is used, they may extend beneath the coves, such that they are externally invisible, Normally, there is a similar configuration of reinforcement belt/straps on each side portion 11, 13 of the child seat 1. In a configuration like the one illustrated in FIG. 9, a first reinforcement belt 107 may run along the outside of the child seat 1, and a second 109 along the inside of the child seat 1. The reinforcement belt 107, 109 may envelope the back of the child seat 1, as in FIG. 9, or may be divided into separate segments at each side of the child seat. The reinforcement belt may be attached to the child seat by means of a loop, a D-ring err a double D-ring. The reinforcement belt is suitably arranged inside of the cover. Further, the reinforcement belt may also be attached to the ISO fix attachments 57, 59, thereby further securing the child seat.

Figure 10:
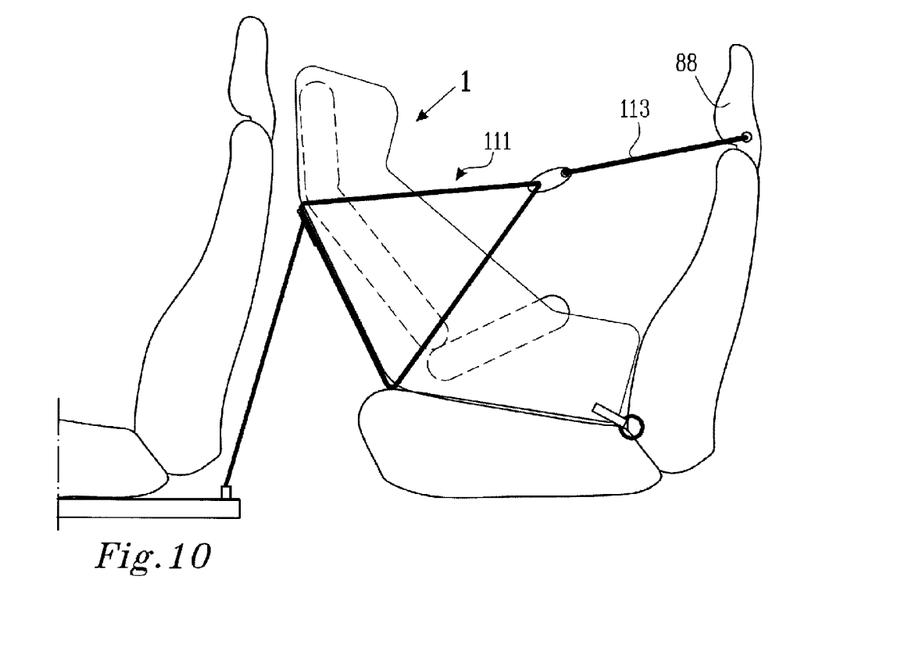
FIG. 10 illustrates a child seat comprising a flexible panel.

In FIG. 10 a flexible panel 111, for example made of a fabric or a net, extends from the child seat 1 in the direction towards the back seat, where a strap 113 may connect the panel 111 to the head rest 88. The flexible panel 111 may be made in one piece, which envelops the back of the child seat 1, or as two separate side pieces.

A kit of parts may, further to the inflatable child seat 1, comprise an inflator in order to facilitate inflation of the inflatable child seat. The inflator may be a manual or motorized air pump. The inflator may be integrated into the child seat, an optional rigid subframe, or remain a discrete device for which storage is provided within the child seat structure or its cover. The inflator can also serve as a deflator to evacuate air from the air chambers in order to allow the child seat to be folded into a more compact volume when not in use. A battery-powered electronic sensor may be used to monitor air pressure. The motorized inflator and sensor may be powered by a 12V vehicle power outlet or by a built-in battery. The air pressure and battery state of charge may be continuously monitor by the electronic system and warnings may be issued as required.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A child seat for rearward-facing use in a vehicle,
   said child seat comprising a back portion and a squab portion,
   said back portion comprising a first side being adapted to support the back of a child, when the child sits in the child seat, and a second side, opposite of said first side, said back portion comprising a lower back region, a shoulder region, and a head region, said squab portion being adapted to support the bottom of the child, when the child sits in the child seat, and said child seat further comprising a child safety belt arrangement for securing the child to be seated in said child seat, wherein said back portion comprises a force-receiving assembly located at said shoulder region, said force-receiving assembly being of a more rigid material than a main portion of said back portion, said main portion being of a light weight material, said force-receiving assembly comprising a first portion arranged at said first side of said back portion providing an anchor point for a shoulder portion of said child safety belt arrangement, and said force-receiving assembly further comprising a second portion arranged at said second side of said back portion providing an anchor point for a child seat fixation means.

2. The child seat according to claim 1, wherein an end of said shoulder portion of said child safety belt arrangement is attached to said first portion of said force-receiving assembly.

3. The child seat according to claim 1, wherein said force-receiving assembly comprises means for anchoring said shoulder portion at a selectable distance from said squab portion.

4. The child seat according to claim 1, wherein said first and said second portion of said force-receiving assembly are connected to each other by a connection belt or strap.

5. The child seat according to claim 1, wherein said child seat fixation means comprises a belt or strap passing through said first and said second portion of said force-receiving assembly.

6. The child seat according to claim 1, wherein said child seat fixation means is provided with a loop, a hook and/or a latch for attachment to a vehicle seat, floor or interior.

7. The child seat according to claim 1, wherein said child seat comprises at least one, at least partly inflatable, air chamber.

8. A kit of parts comprising a child seat according to claim 7 an inflator for inflating said child seat, said inflator being integrated into said child seat.

9. The child seat according to claim 7, wherein said back portion and said squab portion form at least one air chamber, said child seat further comprising side portions adapted to be located at the respective lateral side of said back portion and said squab portion, when said child seat is inflated, said side portions also forming at least partly inflatable air chambers, the air chambers of said back portion squab portion and side portions being interconnectable, such that they form a continuous inflatable volume.

10. The child seat according to claim 7, said air chamber being made of a gas impermeable fabric and comprising limiting means for limiting a maximal separation between at least two gas impermeable fabric surfaces, said limiting means for example being provided by a drop-stitch fabric.

11. The child seat according to claim 1, wherein said child seat further comprises connection members for connecting a belt/strap to said child seat, said connection members being sewn, stitched, bonded and/or glued to said child seat.

12. The child seat according to claim 1, wherein said child seat is reinforced by at least one reinforcement belt/strap, said reinforcement belt/strap extending along a surface of said child seat.

13. The child seat according to claim 1, wherein said child seat further comprises a flexible panel adapted to extend from said child seat, along a lateral side of said child seat when mounted, to a connection point in said vehicle floor or interior.

14. A child seat arrangement comprising
a child seat according to claim 1
at least one rigid subframe, said child seat being adapted for attachment to said at least one rigid subframe, and said rigid subframe being adapted for attachment to a vehicle floor or interior, such that forces may be transferred to and from said child seat to said vehicle floor or interior.

15. A vehicle comprising a child seat according to claim 1, wherein said child seat is mountable in a rearward-facing position in a back seat of said vehicle, such that the fastening of said child seat is made by said child seat fixation means being connected directly to the vehicle body or interior.

* * * * *